2,985,608
METHOD OF IMPROVING PROCESSING OF LOW UNSATURATION RUBBERY COMPOSITIONS

John J. Higgins, New York, N.Y., and Winthrope C. Smith, Westfield, N.J., assignors to Esso Research and Engineering Company, a corporation of Delaware No Drawing. Filed Sept. 23, 1958, Ser. No. 762,707

11 Claims. (Cl. 260—23.7)

The present invention concerns low unsaturation rubbery compositions that have improved processing properties. More particularly, it concerns a process for improving the processability and scorchiness of low unsaturation rubbers containing polymethylol meta-substituted phenol substances by the use of minor amounts of alkali metal, alkaline earth metal or group VIIB metal soaps.

When rubber is mixed, calendered, extruded or otherwise processed after it has been compounded, its temperature may increase as much as 100–200° F. depending upon the particular conditions employed. When the compounded rubber reaches a high temperature, e.g. 220–280° F., it may precure due to the presence of a curing agent such as sulfur, sulfur compounds, polymethylol phenol resins, etc. In most types of processing the compounded rubber should not precure or scorch to any substantial degree until it has been exposed to the aforementioned higher temperatures for at least a few minutes, e.g. 5 minutes. It has been noted that when low unsaturation rubbers, such as butyl rubber, are compounded with polymethylol metasubstituted phenol resins, they become highly scorchy and difficult to mix and calender. Since these resins produce vulcanizates which have extraordinary properties and therefore are valuable in certain articles, it was necessary to search for materials which would reduce this scorchiness.

It has now been discovered that the scorchiness of low unsaturation rubber compounded with polymethylol meta-substituted phenol substances is substantially reduced by the addition of a minor amount of a metal salt or soap. The metal may be selected from groups IA, IIA, and VIIB of the periodic chart (Lange's "Handbook of Chemistry," Eighth Edition, pages 56–57). The preferred metals are found in group IIA which are commonly known as alkaline earth metals. The salts or soaps coming within the purview of the invention are those obtained when the aforementioned metals are reacted with monocarboxylic acids containing from 1–20 carbon atoms, preferably 1–18 carbon atoms. Among the carboxylic acids which may be employed in preparing the soaps are carbonic acid, acetic acid, propionic acid, myristic acid and stearic acid. The most effective compounds are calcium carbonate and calcium stearate. However, other soaps such as barium stearate, magnesium stearate and manganese stearate are quite suitable, especially where it is not desirable to use a calcium soap.

The above-mentioned scorch inhibitors are ineffective or harmful in non-resin butyl rubber stocks. However, when polymethylol meta-substituted phenol resins are compounded with butyl rubber, the aforementioned soaps are quite proficient in retarding scorch while the compounded rubber is being processed. Thus, the soaps of the present invention coact with the resin curing agent to permit processing of the rubber at higher temperatures while not substantially affecting the properties of the vulcanizate.

Of the low unsaturation rubbers which may be compounded according to the present invention, butyl rubber is the most widely known. This rubber is essentially a vulcanizable rubbery hydrocarbon copolymer containing a major proportion of a $C_4$–$C_8$ isoolefin and a minor proportion of a $C_4$–$C_{14}$ multiolefin. Generally, is comprises about 85–99.0 wt. percent, preferably about 95–99.5 wt. percent of isobutylene and about 0.5–15 wt. percent, preferably 0.5–5 wt. percent of butadiene, dimethyl butadiene, piperylene or especially isoprene. Butyl rubber usually has a viscosity average molecular weight of from 200,000 to 1,500,000 or more, and a mole percent unsaturation of from 0.5–15. The preparation of the copolymer is described in U.S. Patent 2,356,128 issued to Thomas et al, as well as in other patents. The term "butyl rubber" is defined in Hackh's Chemical dictionary, 3rd Edition, page 151, and is the title of chapter 24 in "Synthetic Rubber" which was published by John Wiley & Sons, Inc. and edited by G. S. Whitby.

Another low unsaturation rubber which may be compounded according to the present invention, is butyl rubber which has been halogenated so that it contains at least about 0.5 wt. percent combined halogen, but not more than about 1 atom of chlorine or 3 atoms of bromine per double bond in the butyl rubber. However, while halogenated butyl rubber may be so compounded, it is not the preferred low unsaturation rubber.

In practicing the present invention, low unsaturation rubber is compounded with minor amounts of the above-described soaps and polymethylol meta-substituted phenol substances. The preferred meta-substituted substances are trimers or tetramers (3 or 4 cyclic units) prepared from meta hydrocarbon-substituted phenols and formaldehyde. The hydrocarbon substituent or substituents in the meta position or positions may contain from 1–20 or more carbon atoms. The preferred hydrocarbons are normal or isoalkyl groups having from 1–18 carbon atoms. The aromatic ring in the resin may, or may not, have a methylol group in the para position. A generic formula for these meta-substituted phenol substances is as follows:

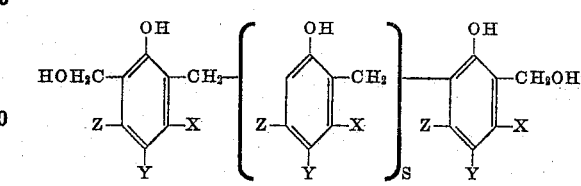

wherein X is a $C_1$–$C_{20}$ alkyl group or hydrogen; Z is a $C_1$–$C_{20}$ alkyl group or hydrogen; Y is a methylol group or hydrogen; and S is 0–5, preferably 1–2. In most of these resins a meta position on the aromatic ring of each monomer has an alkyl group having 18 carbon atoms or less attached to it. The opposed meta position on the ring may, or may not, have a similar alkyl group attached to it. The trimers or tetramers, which are prepared by acid catalysis, generally have an acid pH and a methylol content of 5–20 wt. percent. They produce very scorchy rubber compositions whose scorchiness may be substantially inhibited by practicing the present invention.

In order to cure butyl rubber with this resin it is generally necessary to use a bivalent metal halide to activate the resin. The most effective activator is a group IVA metal, namely, tin. It is preferred to disperse tin halide, e.g. stannous chloride, in a rubber processing oil before compounding it with the rubber. Only a small amount of tin halide is necessary to promote the resin cure of butyl rubber, for instance, about 1–5 parts by weight of stannous chloride may be added to 100 parts by weight of butyl rubber. For example about 50–95 wt. percent stannous chloride may be dispersed in a hydrocarbon oil (e.g. Sun Circle Oil) having a Saybolt Universal viscosity at 100° F. of 166.4 seconds, specific gravity of 0.925, flash point of 360° F. and an aniline point of 155.8. About 1–5 parts by weight of stannous chloride dispersed in oil is compounded with 100 parts by weight of butyl rubber.

The amount of meta-substituted phenol resin used to cure the low unsaturation rubber will vary according to the particular needs. However, it is generally advisable to use at least 2, but not more than 12, parts by weight per 100 parts by weight or rubber (p.h.r.). For example, butyl rubber may be compounded according to conventional techniques with 4–8 p.h.r. of meta-substituted phenol resin and 2–3 p.h.r. of stannous chloride dispersed in oil.

Because the scorch inhibiting properties of the soaps coming within the scope of the present invention are quite effective, it is generally not necessary to use more than 10 p.h.r. of said soaps while in some instances as little as 0.2 or 0.5 p.h.r. is adequate. For most uses it is advisable to employ from 1–5 p.h.r. of the soaps depending upon the effectiveness of the specific soap.

In addition to the meta-substituted phenol resin and the soap, the low unsaturation rubber may be compounded with conventional fillers, such as 20–75 p.h.r. of carbon black or clay; small amounts of stearic acid, e.g. 0.5–5 p.h.r.; up to 30 p.h.r. of hydrocarbon plasticizer oil; a minor amount of an antioxidant such as phenyl beta-naphthylamine, and other common compounding agents prior to curing it at 250°–400° F. for from 1 to about 100 minutes.

The low unsaturation rubber compositions prepared in accordance with the present invention may be used in numerous rubber-containing articles, especially tires, curing bladders, conveyor belts and hoses. In addition to the foregoing, they may be used to insulate wire or cable, as engine mounts, fan belts, etc.

The following examples are given to illustrate some of the specific embodiments of the present invention:

EXAMPLE 1

Isobutylene-isoprene butyl rubber having a mole percent unsaturation of 1.5–2 and an average viscosity molecular weight of 500,000 was compounded with a polymethylol meta-substituted phenol resin which was prepared by condensing 1 mole of 3-pentadecyl phenol with 2 moles of formaldehyde in the presence of dilute hydrochloric acid. The resin product, which was essentially a tetramer, had methylol groups in the 2 and 6 positions of the terminal aromatic rings and a methylol group in the 4 positions of each aromatic ring in the resin. The tetramer had a pH of 3.0, contained 15.5 wt. percent methylol and had less than 1 wt. percent free formaldehyde.

Recipe

| Ingredients | Parts by Weight |
|---|---|
| Butyl Rubber | 100. |
| HAF Black | 50. |
| Stearic Acid | 1. |
| Meta-substituted Phenol Resin (NX3205) | 6. |
| SnCl$_2$.2H$_2$O (75 wt. percent in oil [1]) | 2.5 (active ingredient). |
| Scorch Retarder | As indicated. |

[1] Sun Circle Oil.

The polymer, carbon black and stearic acid were mixed in a 1A Banbury for 8 minutes. The compounded polymer, which was at 250° F., was dumped at the end of this time and put on a cold mill (130° F.) where the remaining ingredients were added over a 10–12 minute period. Each rubber stock was prepared according to the recipe above and was evaluated in the Mooney scorch test at 250° F. using the small rotor with a 1 minute warm-up. The results obtained with various metal stearates are set forth in Table I.

Table I

| Amt. (phr.) | Soap | Init. Read. | Minutes | | | | | | | | | |
|---|---|---|---|---|---|---|---|---|---|---|---|---|
| | | | 1 | 2 | 3 | 4 | 5 | 6 | 7 | 8 | 9 | 10 |
| | Control | 70 | 107 | 120 | 126 | 128 | 129 | 128 | 127 | 126 | 125 | 124 |
| 2.5 | Ca Stearate | 50 | 48 | 47.5 | 48.5 | 50.5 | 55 | 61 | 68 | 74 | 79 | 82 |
| 2.5 | Mg Stearate | 34.5 | 34.5 | 34.5 | 36 | 39 | 42 | 44.5 | 46.5 | 49.5 | 52.0 | 55.5 |
| 2.5 | Ba Stearate | 38 | 38 | 38.5 | 40 | 41.5 | 43 | 44.5 | 46.5 | 48 | 51 | 52.5 |
| 2.5 | Na Stearate | 44 | 44 | 47 | 51 | 59 | 67 | 79 | 83 | 88 | 91 | 93 |
| 2.5 | Cu Stearate | 46 | 52 | 64.5 | 81 | 90 | 96 | 99 | 103 | 105 | 108 | 109 |
| 2.5 | Zn Stearate | 47 | 50 | 53 | 63 | 77 | 86 | 91 | 93 | 96 | 99 | 101 |
| 2.5 | Pb Stearate | 48 | 50 | 61 | 81 | 87 | 92 | 96 | 101 | 103 | 105 | 108 | 109 |
| 2.5 | Al Stearate | 58 | 68 | 88 | 98 | 104 | 111 | 113 | 115 | 118 | 120 | 122 |
| 2.5 | Fe Stearate | 43 | 52 | 67 | 85 | 94 | 99 | 103 | 106 | 108 | 110 | 112 |
| 2.5 | Mn Stearate | 43 | 43 | 43 | 46.5 | 52.5 | 61 | 70 | 76 | 80 | 84.5 | 88 |
| 2.5 | Co Stearate | 47 | 47.5 | 51.5 | 62.5 | 77.5 | 88 | 94.5 | 99 | 103 | 105 | 107.5 |
| 2.5 | Cd Stearate | 53.5 | 55.5 | 62.5 | 76.5 | 87 | 92.5 | 96.5 | 99.5 | 103 | 105 | 106 |

The data in Table I shows that calcium, magnesium, barium and manganese stearates are effective scorch retarders for butyl rubber compounded with meta-substituted phenol-formaldehyde resins having a methylol group attached to the ortho position of each terminal phenyl group. Each of the aforenamed retarders reduced the scorchiness of the compounded rubber so that in every instance 5 or more minutes were required to cause a 10 point rise in the Mooney scorch. Barium stearate was especially effective in this regard. While sodium stearate was not as effective as a scorch retarder as some of the other stearate compounds, it retarded the scorchiness sufficiently to make it advantageous to use it where it is desirable to use alkali metal compound butyl rubber recipes.

EXAMPLE 2

Example 1 was repeated employing various soaps and salts of calcium, one of the preferred metals. The results are set forth in Table II.

Table II

| Amt. (p.h.r.) | Soap | Init. Read. | Minutes | | | | | | | | | |
|---|---|---|---|---|---|---|---|---|---|---|---|---|
| | | | 1 | 2 | 3 | 4 | 5 | 6 | 7 | 8 | 9 | 10 |
| | Control | 70 | 107 | 120 | 126 | 128 | 129 | 128 | 127 | 126 | 125 | 124 |
| 2.5 | Ca Stearate | 50 | 48 | 47.5 | 48.5 | 50.5 | 55 | 61 | 68 | 74 | 79 | 82 |
| 5 | do | 45 | 40 | 37 | 56.5 | 56.5 | 37 | 37.5 | 38.5 | 39 | 39.5 | 40.5 |
| 2.5 | Ca Carbonate | 54 | 51.5 | 51 | 50.5 | 50.5 | 51 | 51 | 51.5 | 51.5 | 52 | 52.5 |
| 2.5 | Ca Oxide | 56 | 58 | 61 | 63 | 67 | 72 | 78 | 84 | | | |
| 0.5 | Ca Carbonate | 39 | 40 | 41.5 | 44.5 | 47.5 | 51 | 54.5 | 58.0 | 61.0 | 62.5 | 65 |
| 2.5 | Ca Sulfide | 60 | 74 | 93.5 | 102.5 | 108 | 111 | 113 | 114 | 114.5 | 114 | 114.5 |
| 2.5 | Ca Propionate | 46 | 44.5 | 46 | 48 | 50.5 | 54.5 | 60.5 | 64.5 | 69.5 | 74 | 77 |
| 2.5 | Ca Oxalate | 72 | 102 | 113 | 119 | 120.5 | 120 | 120 | 120 | 119 | 118 | 117 |
| 2.5 | Ca Acetate | 40.0 | 39.5 | 41.5 | 44.5 | 48.5 | 51.5 | 55 | 58.5 | 60.5 | 62.5 | 64.5 |
| 0.75 | do | 51 | 55.5 | 66 | 81.5 | 87 | 90 | 91.5 | 91.5 | 92 | 92.5 | 92 |

The results show that calcium stearate and calcium carbonate are very effective scorch retarders for butyl rubber compounded with meta-substituted phenol-formaldehyde resins which are generally dimers, trimers or tetramers. The latter is an excellent retarder even when employed in amounts less than 1 p.h.r. The dicarboxylic acid, sulfide and oxide compounds were much less effective than the monocarboxylic acids, e.g. calcium acetate, propionate, carbonate and stearate. Thus the monocarboxylates are unique as scorch retarders for the meta-substituted phenolic resins and butyl rubber.

A number of the rubber stocks described in Examples 1 and 2 which contained the more effective scorch retarders were cured at 320° F. for 60 minutes and their physical properties evaluated. Each vulcanizate was then aged for 1 week at 300° F. and its physical properties were reevaluated at the end of that time. The results are set forth in Table III.

with other meta-substituted phenol-formaldehyde resins, such as the resin obtained when 3,5 diisopropyl phenol and formaldehyde are reacted in the presence of dilute acid (e.g, hydrochloric acid). Other resins may be prepared by reacting 1 mole of 3,5-diisobutyl phenol, 3-decyl phenol, 3,5-dioctyl phenol or 3,5-dipentyl phenol with about 2 moles of formaldehyde in the presence of dilute acid (e.g. 0.1 N-hydrochloric) for from a few minutes to several hours at from room temperature to an elevated temperature (e.g. 70° C. or higher).

The beneficial scorch retarding results obtained with the compounds of the present invention are surprising in view of the fact these compounds have no retardation effect and in many instances they appear to promote scorching in low unsaturation rubbers compounded with conventional curing system. This is demonstrated by the following wherein the same butyl rubber employed in the foregoing examples was compounded according Table III
PHYSICAL PROPERTIES

| Amount (p.h.r.) | Description | Tensile, p.s.i. | | Elongation, Percent | | 200% Modulus, p.s.i. | | Shore "A" Hardness | |
|---|---|---|---|---|---|---|---|---|---|
| | | Orig. | Aged | Orig. | Aged | Orig. | Aged | Orig. | Aged |
| | Control | 1,960 | 1,480 | 310 | 280 | 1,050 | 950 | 62 | 66 |
| 2.5 | Ca Stearate | 1,830 | 1,220 | 420 | 320 | 620 | 710 | 60 | 66 |
| 5 | do | 1,610 | 950 | 510 | 330 | 380 | 560 | 59 | 66 |
| 2.5 | Ca Carbonate | 1,160 | 650 | 500 | 480 | 400 | 310 | 59 | 64 |
| 0.5 | do | 1,350 | 860 | 520 | 390 | 420 | 390 | 62 | 66 |
| 2.5 | Ca Propionate | 1,600 | 840 | 490 | 350 | 460 | 450 | 64 | 68 |
| 2.5 | Ca Acetate | 1,160 | 430 | 430 | 420 | 440 | 250 | 60 | 63 |
| 2.5 | Mg Stearate | 1,520 | 1,420 | 440 | 290 | 520 | 910 | 63 | 72 |
| 2.5 | Mg Carbonate | 1,650 | | 440 | | 550 | | 57 | |
| 2.5 | Ba Stearate | 1,600 | 950 | 490 | 380 | 430 | 440 | 63 | 70 |
| 2.5 | Na Stearate | 2,170 | 1,480 | 380 | 290 | 870 | 920 | 63 | 69 |
| 2.5 | Mn Stearate | 1,960 | 1,430 | 370 | 260 | 830 | 1,030 | 64 | 68 |

The above data show that while certain scorch retarders reduce the tensile strength and modulus of the vulcanizate, others, such as calcium stearate, calcium propionate, magnesium stearate, barium stearate, sodium stearate and manganese stearate have little or no effect on the properties of the compounded rubber. Thus, for instance, 2.5 p.h.r. of either calcium stearate or manganese stearate will substantially retard scorch and yet not seriously injure the physical properties generally desirable in a vulcanizate. The magnesium carbonate compounded rubber, whose properties are shown in Table III, did not cause a ten point rise in the aforementioned Mooney scorch test until it had been run 5 minutes. Thus, while magnesium carbonate is not as effective as calcium carbonate as a scorch retarder for meta-substituted phenolic resin compounded with low unsaturation rubber, it has a less injurious effect on the properties of the vulcanizate.

Similar results are obtained with these scorch retarders to the recipe below and evaluated in the Mooney scorch test:

Recipe

| Ingredients | Parts by Weight |
|---|---|
| Butyl Rubber | 100 |
| HAF Black | 50 |
| Zinc Oxide | 5 |
| Tellurium Diethyl Dithiocarbamate | 2 |
| Sulfur | 1.5 |

The polymer, carbon black and zinc oxide were mixed in a 1A Banbury for 8 minutes. The resulting compounded polymer was dumped and the remaining ingredients, including the metal stearates, were added on a 130° F. mill. Each rubber stock was prepared according to the recipe above and was evaluated in the Mooney scorch test at 250° F. using the small rotor with a one minute warm-up. The results obtained with various metal stearates are set forth in Table IV.

Table IV

| Amt. (p.h.r.) | Soap | Init. Read. | Minutes | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| None | None | 50 | 47.5 | 46.5 | 45.5 | 45.5 | 45.5 | 45.5 | 46 | 47 | 48.5 | 51 | 57.5 |
| 2.5 | Ca Stearate | 44.5 | 40.5 | 39.5 | 39.5 | 40.5 | 41 | 42.5 | 43.5 | 45.5 | 48 | 51 | 56 |
| 2.5 | Zn Stearate | 46 | 43.5 | 42.5 | 43.0 | 44.0 | 45.5 | 47.0 | 49.5 | 52.0 | 56 | 63.5 | 73 |
| 2.5 | Mn Stearate | 46 | 43.5 | 42.5 | 43.0 | 43.5 | 44.5 | 45.5 | 47.5 | 50.5 | 53.5 | 59.0 | 69 |

While the control used in this example was not as scorchy as that employed in the previous examples, the data clearly show that the soaps evaluated not only failed to reduce the scorchiness of the compounded butyl rubber, but rather, especially in the case of manganese stearate and zinc stearate, substantially increased scorchiness.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. A method for improving the processing of butyl rubber which is a copolymer of a major proportion of an isoolefin having 4 to 14 carbon atoms and which butyl rubber has been compounded with 2 to 12 parts by weight based on rubber of polymethylol meta-substituted phenolic substances having the formula

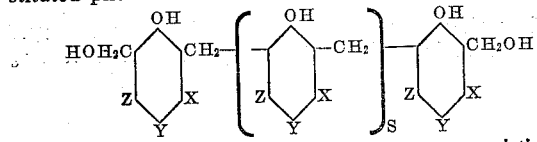

where X and Z are chosen from the group consisting of a $C_1$ to $C_{20}$ alkyl group and hydrogen, Y is chosen from the group consisting of a methylol group and hydrogen and S is an integer from 0 to 5 which comprises mixing said compounded rubber with 0.2 to 10 parts based on rubber of a metal compound chosen from the group consisting of barium stearate, sodium stearate, calcium stearate, calcium propionate, calcium carbonate, magnesium stearate, and manganese stearate.

2. Method according to claim 1 in which the metal compound is calcium stearate.

3. Method according to claim 1 in which the metal compound is calcium carbonate.

4. A rubber composition which comprises 100 parts by weight of butyl rubber which is a copolymer of a major proportion of an isoolefin having 4 to 8 carbon atoms and a minor proportion of a conjugated diolefin having 4 to 14 carbon atoms, about 2 to 12 parts by weight based on rubber of a polymethylol meta-substituted phenolic substance having the formula

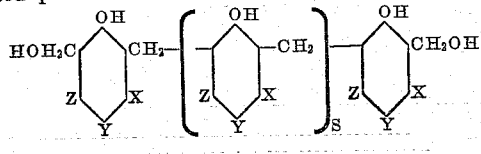

where X and Z are chosen from the group consisting of a $C_1$ to $C_{20}$ alkyl group and hydrogen, Y is chosen from the group consisting of a methylol group and hydrogen and S is an integer of 0 to 5, about 1 to 5 parts by weight based on rubber of a bivalent metal halide and about 0.2 to 10 parts by weight based on rubber of a metal compound chosen from the group consisting of barium stearate, sodium stearate, calcium stearate, calcium propionate, calcium carbonate, magnesium stearate, and manganese stearate.

5. A rubber composition according to claim 4 in which the metal compound is calcium stearate.

6. A rubber composition according to claim 4 in which the metal compound is calcium carbonate.

7. A rubber composition according to claim 4 in which the polymethylol meta-substituted phenolic substance is the condensation product of 1 mole of 3-pentadecyl phenol and 2 moles of formaldehyde prepared in the presence of an acid catalyst.

8. A rubber composition according to claim 7 in which the bivalent metal halide is stannous chloride and the metal compound is calcium stearate.

9. A rubber composition according to claim 7 in which the bivalent metal halide is stannous chloride and the metal compound is calcium carbonate.

10. A rubber composition according to claim 7 in which the polymethylol meta-substituted phenolic substance is a condensation product of 3,5-diisopropyl phenol and formaldehyde prepared in the presence of an acid catalyst, the bivalent metal halide is stannous chloride and the metal compound is calcium stearate.

11. A rubber composition according to claim 7 in which the polymethylol meta-substituted phenolic substance is a condensation product of 3,5-diisopropyl phenol and formaldehyde prepared in the presence of an acid catalyst, the bivalent metal halide is stannous chloride and the metal compound is calcium carbonate.

References Cited in the file of this patent

UNITED STATES PATENTS

| 2,657,185 | Young et al. | Oct. 27, 1953 |
| 2,782,829 | Peterson et al. | Feb. 26, 1957 |
| 2,797,204 | Shepard et al. | June 25, 1957 |
| 2,857,357 | Smith | Oct. 21, 1958 |